(12) United States Patent
Singhal

(10) Patent No.: US 10,592,885 B2
(45) Date of Patent: Mar. 17, 2020

(54) DEVICE FOR COMMUNICATING PREFERENCES TO A COMPUTER SYSTEM

(71) Applicant: Rahul Singhal, Bangalore (IN)

(72) Inventor: Rahul Singhal, Bangalore (IN)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 711 days.

(21) Appl. No.: 15/202,051

(22) Filed: Jul. 5, 2016

(65) Prior Publication Data

US 2018/0012211 A1 Jan. 11, 2018

(51) Int. Cl.

| | |
|---|---|
| *G06Q 20/00* | (2012.01) |
| *G06Q 20/20* | (2012.01) |
| *G06K 19/06* | (2006.01) |
| *G06Q 20/34* | (2012.01) |
| *G06Q 20/32* | (2012.01) |
| *G06K 19/07* | (2006.01) |

(52) U.S. Cl.
CPC ....... *G06Q 20/204* (2013.01); *G06K 19/0614* (2013.01); *G06K 19/06028* (2013.01); *G06K 19/06037* (2013.01); *G06K 19/06065* (2013.01); *G06K 19/06178* (2013.01); *G06K 19/06187* (2013.01); *G06K 19/0723* (2013.01); *G06Q 20/32* (2013.01); *G06Q 20/3278* (2013.01); *G06Q 20/34* (2013.01); *G06Q 20/346* (2013.01); *G06Q 20/352* (2013.01); *G06Q 20/356* (2013.01); *G06Q 20/3567* (2013.01)

(58) Field of Classification Search
CPC .................. G06Q 10/087; G06Q 20/3255
USPC ................................. 705/16, 26
See application file for complete search history.

(56) References Cited

U.S. PATENT DOCUMENTS

| | | | |
|---|---|---|---|
| 2011/0251892 A1* | 10/2011 | Laracey | G06Q 30/0253 705/14.51 |
| 2012/0054046 A1* | 3/2012 | Albisu | G06Q 20/20 705/16 |
| 2012/0173348 A1* | 7/2012 | Yoo | G06Q 20/10 705/16 |
| 2013/0024371 A1* | 1/2013 | Hariramani | G06Q 20/36 705/41 |
| 2013/0159080 A1* | 6/2013 | Wu | G06Q 30/02 705/14.23 |
| 2013/0232070 A1* | 9/2013 | Sharma | G06Q 20/40 705/44 |
| 2014/0214644 A1* | 7/2014 | Rephlo | G06Q 40/02 705/35 |

* cited by examiner

*Primary Examiner* — Rokib Masud
(74) *Attorney, Agent, or Firm* — Loeb & Loeb LLP

(57) ABSTRACT

The described device allows a user to set preference and receive the preferences by simply allowing a payment device to communicate with a preference reader.

20 Claims, 7 Drawing Sheets

DEVICE FOR COMMUNICATING PREFERENCES TO A COMPUTER SYSTEM

BACKGROUND

Consumers often know exactly what they want when they enter a merchant location. In some rare situations, the consumer may be recognized and the usual order for the consumer may be started. However, for the vast majority of people and situations, the consumer has to repeated verbally communicate an order which may be the same day after day. Thus, it would be useful if the consumer could communicate preference information to a merchant in a consistent and predictable format.

SUMMARY

The described device, system and method allows a user to set preference and receive the preferences by simply allowing a payment device to communicate with a preference reader. In one aspect, a user may allow a payment device such as a credit card or mobile payment device to communicate a payment preference indication to an electronic reader at the merchant. The payment preference may be validated and the actual service or good that is represented by the payment preference may be quickly and promptly obtained for the user.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

In the economy today, people feel like they have less and less time. The ability to save consumers' time would be welcome by consumers. Further, merchants would like to be able to serve more customers in a given period of time and do so in a more accurate way. Specially designed computer systems and computer software may be able to save both consumers and merchants time and provide for more accurate orders which may be pleasing to all parties.

Figure 1:
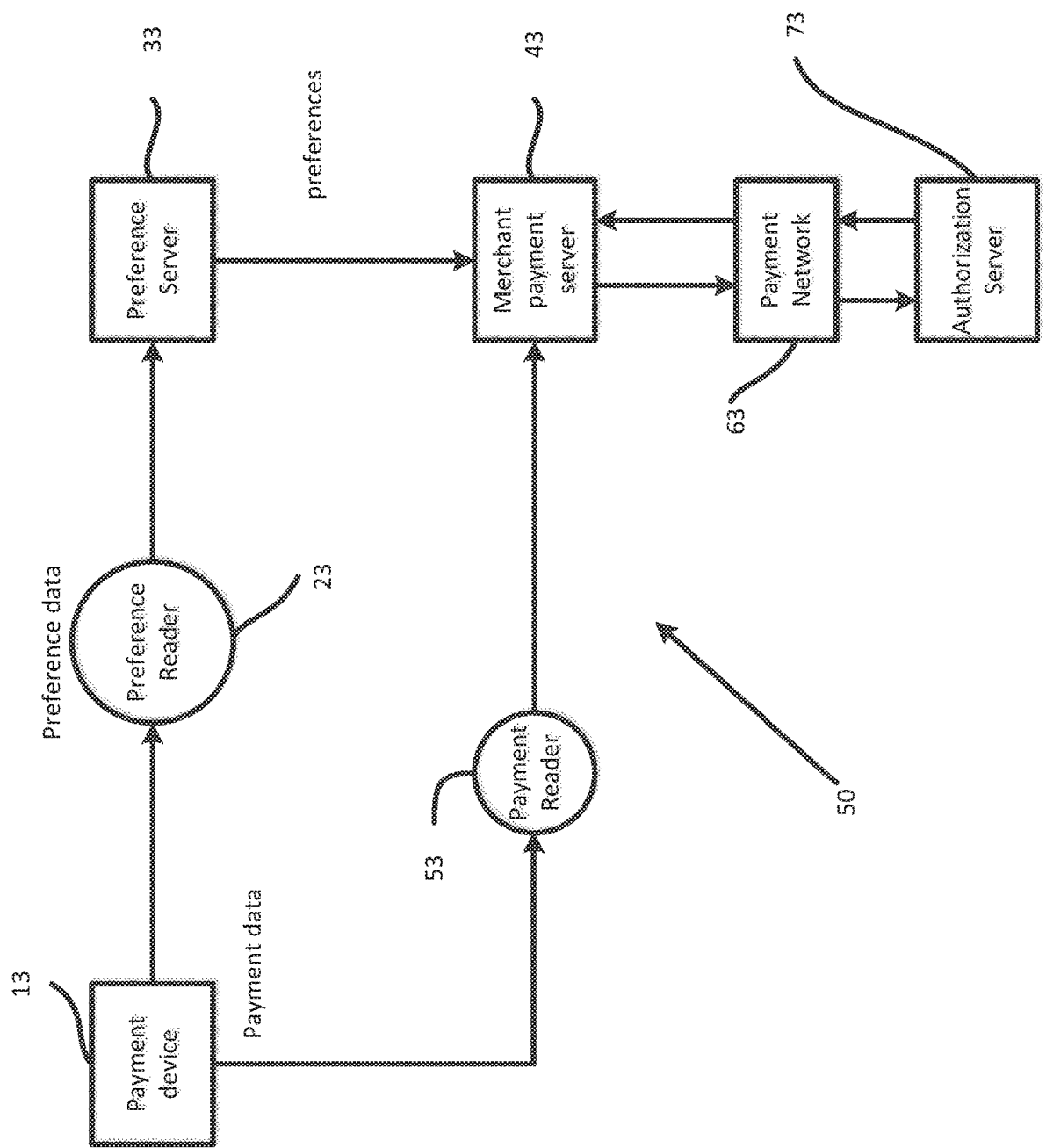
FIG. 1 is an illustration of some of the devices including a physical payment device that are part of the system.

As illustrated in FIG. 1, the described devices, computer hardware and software may address the time and accuracy issue may installing a preference code on a payment device 13 such that the preference code may be read by a preference reader 23. The preference code may be analyzed by a preference server 33 and the consumers preferences may be communicated to the merchant 43. The transaction, including communicating the payment data through a payment reader 53 to a payment network 63 where it may be may continue quickly and accurately.

Figure 2:
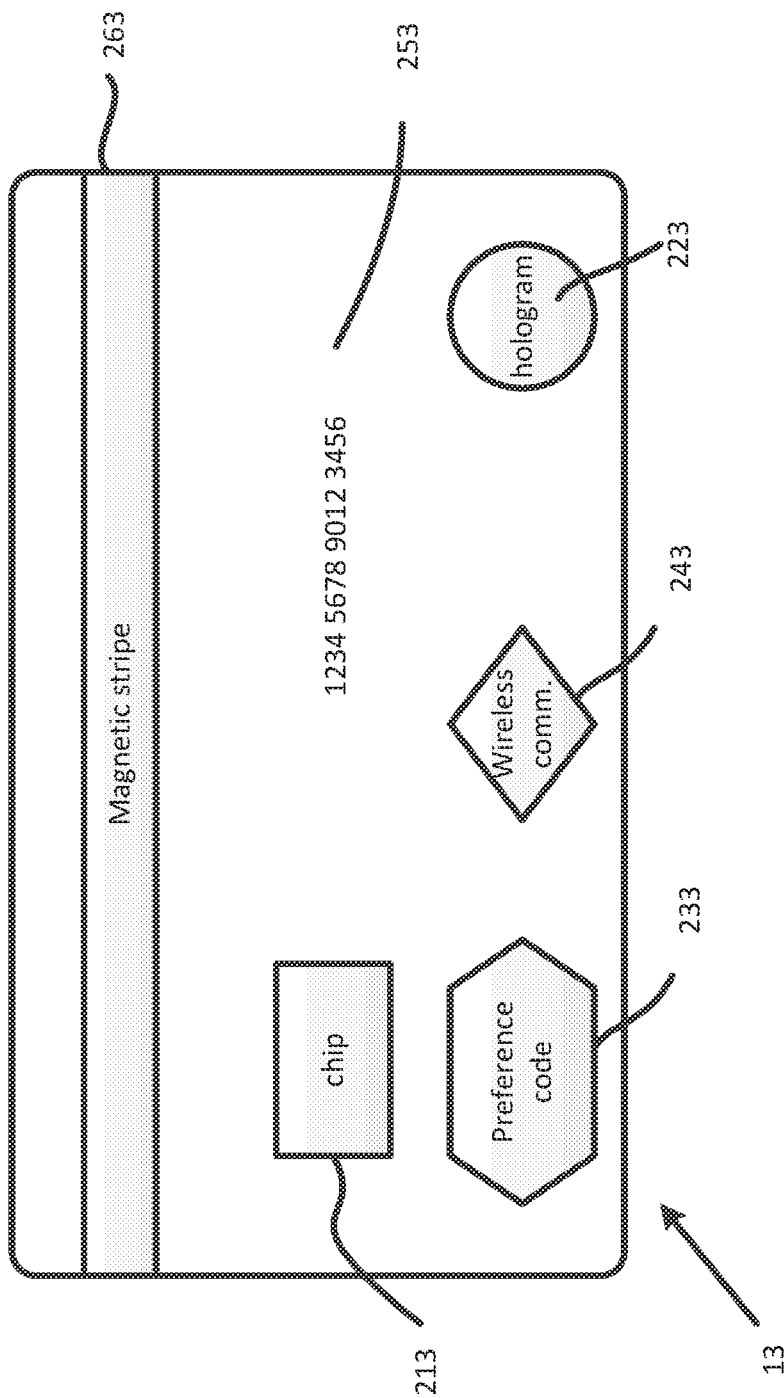
FIG. 2 is an illustration of a physical payment device that may be used by the system.

The payment device 13 may have a number of embodiments. In one embodiment, the payment device 13 may be a traditional credit card or debit card or any physical card that is used for payments such as a loyalty card, a gift card, a reward card, etc. As illustrated in FIG. 2, the payment device 13 may have a magnetic stripe 263, an electronic verification chip 213, a personal account number 253, a security hologram 223, a wireless communication chip 243, a preference code 233 and several logos (not shown) which indicate the origin of the card such as the issuing bank or card sponsor.

Figure 3:
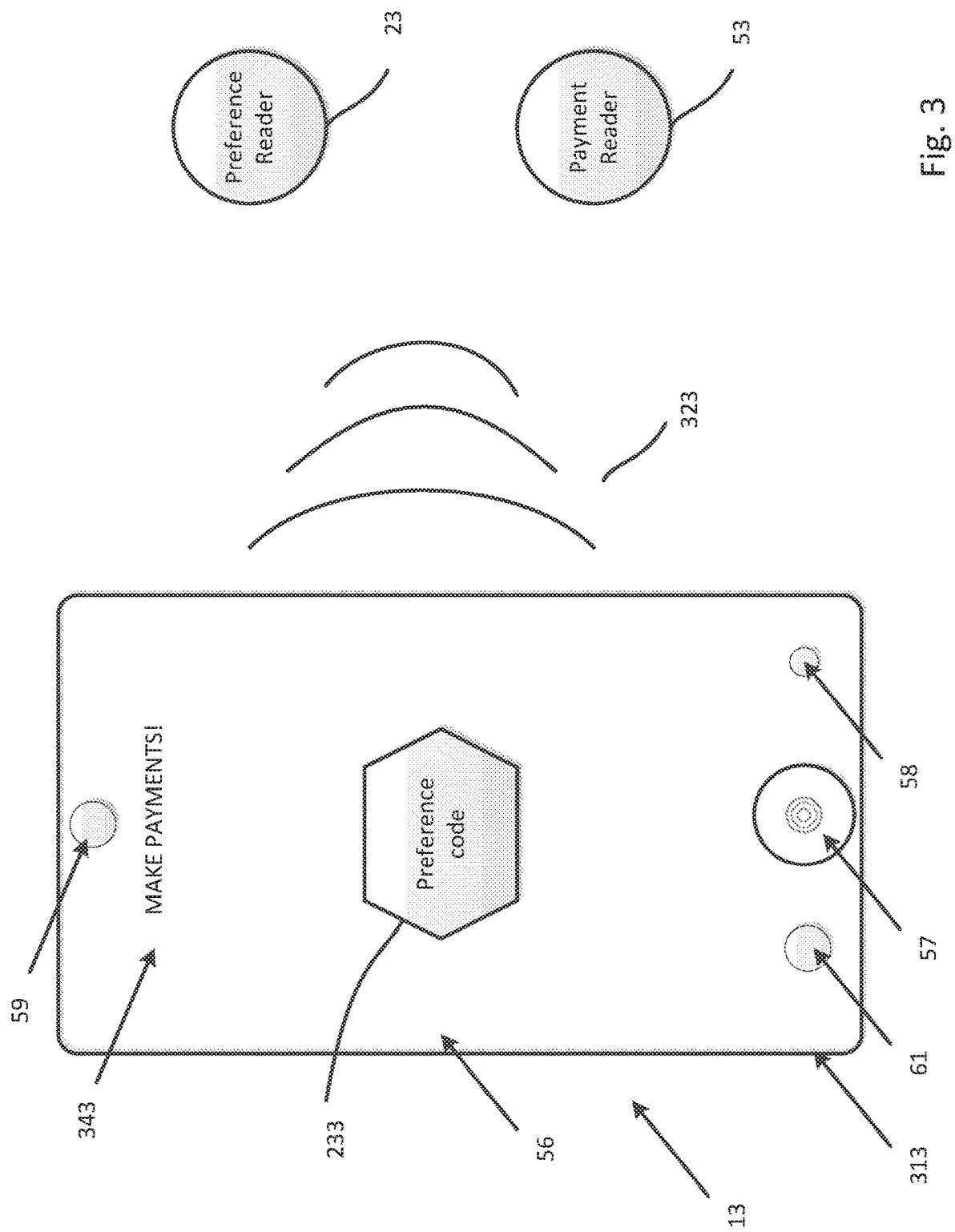
FIG. 3 is an illustration of some of the devices including a portable computing device that are part of the system.

In another embodiment as illustrated in FIG. 3, the payment device 13 may be an electronic payment application 343 which may operate on a computing device such as a portable computing device 313 like a smart phone or on a personal computer. The portable computing device may be similar to portable computing device 313 in FIG. 4. The processor in the portable computing device 313 may be physically configured to execute the payment application 343. The payment application 343 may store relevant information on a plurality of accounts which may be used to pay for goods or services. In use, a user may be able to select one the accounts to pay for a good or service. The actual account numbers may not be used but a token that represents the account numbers may be used and the token may be matched to an actual account number by a token server which may be part of the payment network 63.

The preference code 233 may be a unique image which is embedded in the payment device 13. If the payment device 13 is a physical card, the preference code 233 may be a visual code such as a QR code, a bar code, or any other code which is readable by an electronic sensor. The QR code may be unencrypted or encrypted and if the QR code is encrypted, an encryption server may be needed to unencrypt the QR code. In some embodiments, the decryption may occur at the preference server 33 or at another node on the network.

In some additional embodiments such as illustrated in FIG. 2, the preference code 233 may be embedded in the payment device 13 such as in the chip on chip cards 213, in the magnetic stripe 263 of traditional credit cards 13, in a security hologram 223, or in an ink which is not visible to the human eye but that may be readable to the properly designed reading device such as a code printed using ultra-violet ink.

In some embodiments, the preference code 233 may be pre-assigned to the payment device 13. For example, a credit card may have a unique code printed on it at the time of manufacture. In other embodiments, a user may be able to select to have the preference code 223 added to the payment device. In the case of a physical card, a new card may be created or a sticker may be added to an existing card.

Figure 6:
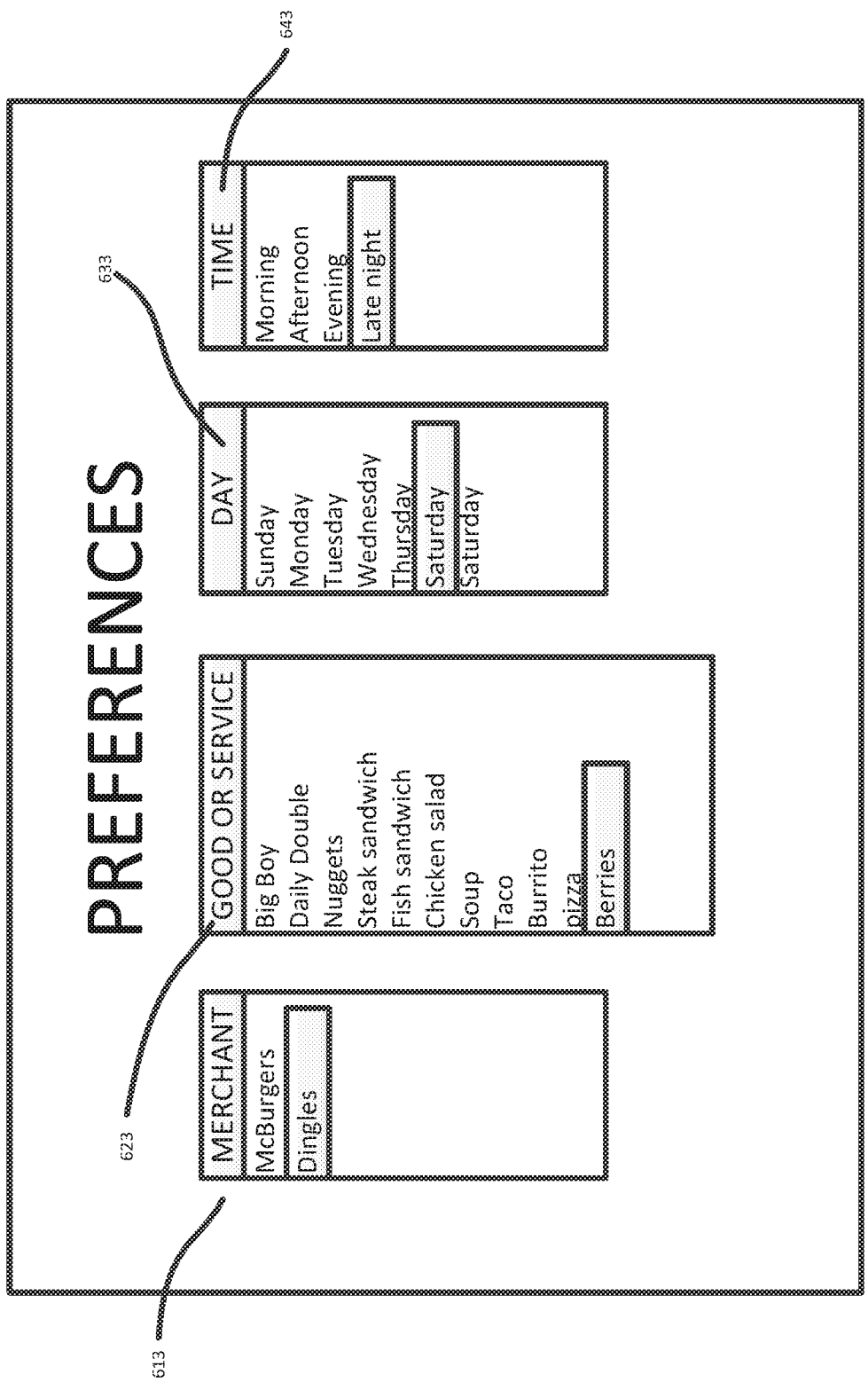
FIG. 6 is an illustration of a graphical user interface to accept user preferences.

In the embodiment where the payment device is a payment application 343 on a portable computing device such as in FIG. 3, the preference code 233 may be added to the payment application 343 using addition computer instructions which may be used to physically configure the processor to execute the display of the preference code 233. For example, a user may enter preferences in a user interface such as illustrated in FIG. 6 and the preference code 233 may be pushed to the portable computing device 313.

In some additional embodiments such as in FIG. 3, the preference code 233 may be communicated wirelessly. In the embodiments where the payment device 223 is a physical card, the preference code 233 may be an RFID type device 243 in the card which may be activated when placed in an appropriate RF field. In another embodiment, a wireless communication chip 243 and a battery may be in the card and the wireless communication chip may communication the preference code 233 when placed in range of a wireless receiver or a wireless power source. If the payment device 13 is a mobile computing device 313, the mobile computing device 313 may have several wireless communication capabilities including Wi-Fi, cellular, Bluetooth, BLE, etc., all of which may be used to communicate the preference code 233 to a wireless receiver.

In some embodiments, the selection of the physical appearance of the preference code 233 may be made by the user while the preference code 233 may still contain preference code information. For example, an image of a pony may be selected by a consumer but the image of the pony may also contain a QR code or the image of the pony may be made unique such that it may only represent a single consumer. Similarly, the preference code 233 may have a first appearance visible to humans and a second appearance which is not visible but may contain preference code information.

The preference code 233 may be presented to an electronic reader 23 (FIG. 1) of the merchant. Logically, the reader 23 may have many embodiments to be able to handle the many embodiments of the preference code. For example, if the preference code 233 is a QR code, the electronic reader 23 may be a QR code reader. If the preference code 233 is an ultra-violet code, an ultra-violet light source and an ultra-violet image sensor may be used. If the preference code 233 is in the chip 213, the preference code 233 may be read through the chip reader which may be part of a point of sale device 53 or may be separate. If the preference code 233 is in the hologram 223, the preference code 233 may be read through an image sensor. If the preference code is stored in a wireless communication device, the preference code may be received by a wireless communication receiver. Logically, the form of the preference code 233 may dictate the form of the electronic reader 23. The electronic 23 reader may be in communication with a preference server 33. Further, the electronic reader 23 may be a stand-alone device or may be part of a purchase server or device 53 such as a point of sale device.

The preference code 233 may then be translated into a format for communication to a preference server 33 where it may be translated or matched to a preselected preferred good or service. The preference server 33 may be a form of the server 65 illustrated in FIG. 5. In some embodiments, the preference code 233 may be an image and the image may be communicated to the preference server 33 for translation. In other embodiments, the electronic receiver 23 may convert the preference code 233 into a form or unique code that is appropriate for communication and can be understood by the preference server 33.

The unique code which represents the preference code 233 (or may be an image of the preference code) may be communicated to a preference server 33 for analysis. In addition, the communication may include an indication of the merchant or an indication of the reader device 23 which may then be matched to a merchant. The communication may be over a non-payment network. A payment network 63 may be a specially built and designed network which may be designed to handle payment communications. The payment network 63 may have increased security and may handle a limited number of formats. The non-payment network may include the internet, a cellular communication channel, a Wi-Fi channel, etc. By using a non-payment network, traffic on the payment network 63 may be saved. The technical problem of network traffic on the payment network 63 may be addressed by having the payment data on a non-payment network.

Once at the preference server 33, the unique code representing the preference code 233 may be analyzed to determine if the unique code may be matched to products or services available at the merchant. If there is no match, a notice may be communicated to the merchant to notify the customer that the preference code failed to match any known products or services. If the preference server 33 determines there is a match, the matching good or service may be communicated to the merchant for fulfillment. The matching good or service may be a preset preference by the user. The communication may occur in a variety of manners and may be over a non-payment network such as the internet or over a cellular channel.

The preset preferences may be set by a user in advance using a graphical user interface 603 such as in FIG. 6 designed for users to select preferences which may be stored by the preference server 33. The user may log into a preference server, may select a merchant 613 and may set preferences for one or more merchants 613. For example, a user may login, select a coffee house and may select the preferred drink as being a large latte. Similarly, the user may log into a car wash and may indicate a hand car wax is the preferred service. The same preference code 233 on the payment device 13 may be used for a plurality of merchants and a plurality of preferred goods. The options available to be selected as preferences may be created by a merchant 613 and the options 623, 633, 643 may appear as options to the consumer to select as preferences. In another embodiment, a user may attempt to create their own preference for the merchant and the merchant may have the option to accept or reject the submission.

The selected preference options may be stored as preferences for that merchant for that consumer. The preferences may be stored in a database in the preference server 33. The selected preferences also may have additional factors that may related to the preferences such as preferring a first good on weekdays in the morning but preferring a second good on weekend evenings. Other factors may be added and are contemplated, such as temperature, weather, season, sales occurring, etc.

Once the preference code 233 is received by the preference server 33, it may be validated. If the preference code 233 is not recognized, the merchant and consumer may be notified that the preference code 233 is not recognized at this merchant. If the preference code 233 is recognized, the consumer preference may be communicated to the merchant 43 for fulfillment. As a result of the system, a user may not have to speak at all to merchant staff and the order may be perfectly communicated. In addition, the merchant may be able to understand and fulfill the exact desires of a variety of clients in a reliable and consistent matter. Thus, time is saved for consumers and merchants. Further, order accuracy is improved.

Once the preferences are communicated, a user may use the payment device 13 to pay for the transaction. The payment path may be a traditional path where a personal account representative code may be communicated to a point of sale reader 53 and then to a validation server 73 by the point of sale reader on a payment system network 63. In response to the validation server 73 approving the personal account representative code, an approval code may be communicated to the point of sale device 53 over the payment network 63 and a transaction for the preset preference at the merchant may be executed.

In an additional aspect, the system may have a learning server (not shown) which may, with sufficient user permissions, monitor purchases and may determine preferences for a user. For example, if a consumer at a coffee house always purchases a large latte, it is likely the next time the consumer visits the store that the user will purchase a large latte. Thus, the system may take one or more steps to assist the user in creating a preference. In one embodiment, if the payment device 13 is a portable computing device 313 and an appropriate app is on the portable computing device 313, the app may display the option to the user to set up the large latte as a preference at the coffee house. In another embodiment, such as when the payment device 233 is physical card, an electronic message such as an email, text message or SMS message may be communicated to the consumer indicated the determined preference and whether the user would accept the preference as being set in the preference server. Of course, other manners of reminding a user of a determined preference are possible and are contemplated.

The determination of the preference may follow a logical sequence of observing the purchases of a consumer (with the consumer's permission) over a period of time at given merchants. The purchases may be scored and when the purchase scores are over a threshold, the purchases may be recommended as preferences. The scoring may be based on frequency of purchase, time of purchase, amount of purchase, repeat purchases, etc. As an example, a consumer may prefer a large latte in the morning from a coffee shop but may prefer a glass of red wine in the evenings from the coffee shop. By using time as a factor in scoring the preferences, the preference recommendations may be more accurate.

Figure 4:
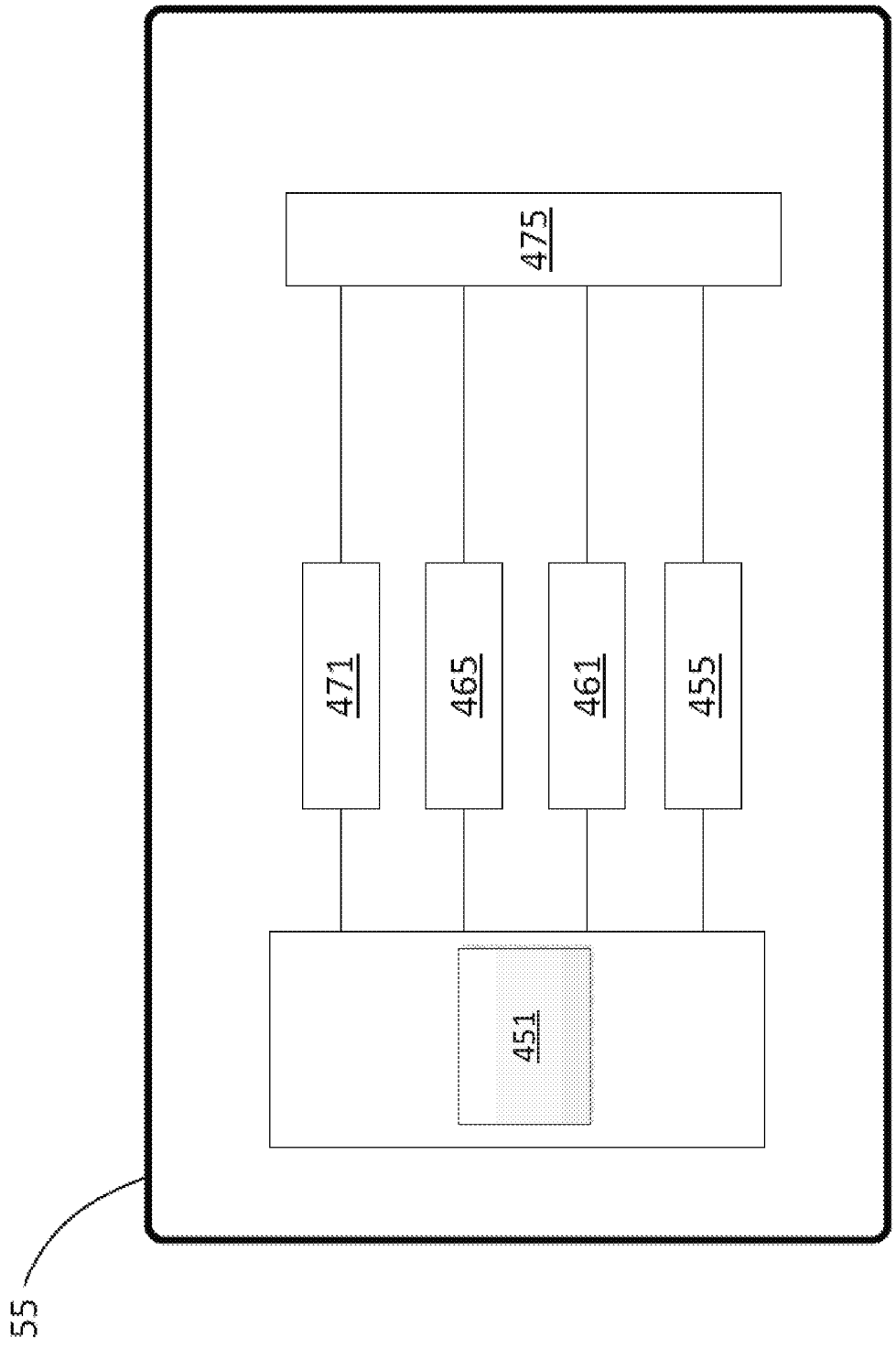
FIG. 4 is an illustration of a sample portable computing device.

In one embodiment, the portable computing device 313 may be a device that operates using a portable power source 455, as shown in FIG. 4, such as a battery. The computing device 313 may also have a display 56 which may or may not be a touch sensitive display. More specifically, the display 56 may have a capacitance sensor, for example, that may be used to provide input data to the computing device 313. In other embodiments, an input pad 57 such as arrows, scroll wheels, keyboards, etc., may be used to provide inputs to the computing device 313. In addition, the computing device 313 may have a microphone 58 which may accept and store verbal data, a camera 59 to accept images and a speaker 61 to communicate sounds.

The computing device 313 may be able to communicate with a computer server or a plurality servers, such as the preference server 33, the merchant payment server 43, etc. The computing device 313 may be able to communicate in a variety of ways. In some embodiments, the communication may be wired such as through an Ethernet cable, a USB cable or RJ6 cable. In other embodiments, the communication may be wireless 323 such as through Wi-Fi (802.11 standard), Bluetooth, cellular communication or near field communication devices. The communication may be direct to the server or may be through a digital communication network such as cellular service, through the Internet, through a private network, through Bluetooth, etc.

To assist in enabling the device, system and method, a set of application programming interfaces (APIs) may be created which help in enabling the system. For example, a payment service provider may publish the APIs such that merchants may easily access the system to allow preferences to be created and for preferences to be easily accessed using some known commands in known formats.

In addition, providers may provide the hardware to enable to system and method. For example, a provider may store all the preferences available for a merchant, all the preferences created by users, and may publish the APIs for merchants to easily access and use the system. Further, some providers may also provide the preference reader and even the payment reader to further ease the use of the system for merchants. And in some embodiments, the providers may provide the preference code 233 that may be placed on the payment devices 223.

Figure 5:
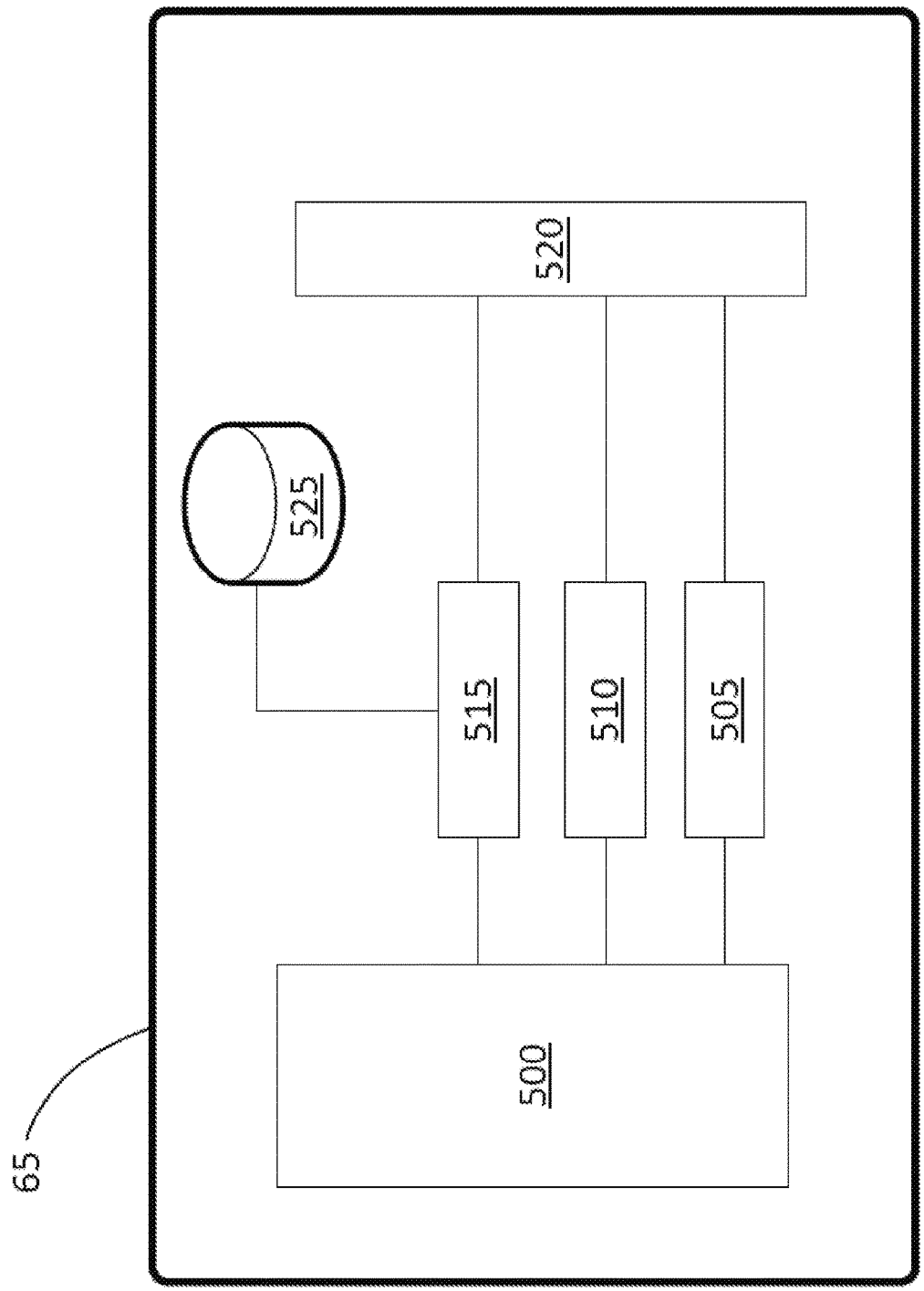
FIG. 5 is an illustration of a sample server that may be part of the system.

FIG. 4 is a simplified illustration of the physical elements that make up an embodiment of a computing device 313 and FIG. 5 is a simplified illustration of the physical elements that make up an embodiment of a server type computing device, such as the preference server 33, but the various servers may reflect similar physical elements in some embodiments.

Referring to FIG. 4, a sample portable computing device 313 is illustrated that is physically configured according to be part of the computing system 50 shown in FIG. 1. The portable computing device 313 may have a processor 451 that is physically configured according to computer executable instructions. In some embodiments, the processor can be specially designed or configured to optimize communication between the server 65 and the computing device 313 relating to the preference application system discussed herein. The computing device 313 may have a portable power supply 455 such as a battery which may be rechargeable. It may also have a sound and video module 461 which assists in displaying video and sound and may turn off when not in use to conserve power and battery life. The computing device 313 may also have volatile memory 465 and non-volatile memory 471. The computing device 313 may have GPS capabilities that may be a separate circuit or may be part of the processor 451. There also may be an input/output bus 475 that shuttles data to and from the various user input/output devices such as a microphone, the camera 59, a display 56, or other input/output devices. The portable computing device 313 also may control communicating with the networks, such as communication network in FIG. 1, either through wireless or wired devices. Of course, this is just one embodiment of the portable computing device 313 and the number and types of portable computing devices 101 is limited only by the imagination.

The physical elements that make up an embodiment of a server, such as the e-commerce enabler server 65, are further illustrated in FIG. 5. In some embodiments, the preference server 33 is specially configured to run a preference engine as described herein. At a high level, the server 65 may include a digital storage such as a magnetic disk, an optical disk, flash storage, non-volatile storage, etc. Structured data may be stored in the digital storage such as in a database. More specifically, the server 65 may have a processor 500 that is physically configured according to computer executable instructions. In some embodiments, the processor 500 can be specially designed or configured to optimize communication between a portable computing device, such as computing device 313, and the server 65 relating to the e-commerce enabler application and reward points incentive system as described herein. The server 65 may also have a sound and video module 505 which assists in displaying video and sound and may turn off when not in use to conserve power and battery life. The server 65 may also have volatile memory 510 and non-volatile memory 315.

A database 525 for digitally storing structured data may be stored in the memory 510 or 515 or may be separate. The database 525 may also be part of a cloud of servers and may be stored in a distributed manner across a plurality of servers. There also may be an input/output bus 520 that shuttles data to and from the various user input devices such as a microphone, a camera, a display monitor or screen, etc. The input/output bus 520 also may control communicating with the networks, such as communication network and payment network 63, either through wireless or wired devices. In some embodiments, the e-commerce software application running the preference engine may be located on the computing device 313. However, in other embodiments, the application may be located on e-commerce server 55, or both the computing device and the server 65. Of course, this is just one embodiment of the e-commerce server 65 and additional types of servers are contemplated herein.

The system and methods are more than just speeding a process but instead uses a computing system to achieve a new and better outcome using a device with new physical features and functionality. The devices, system and methods disclosed herein provide users and payment card issuers with greater access to payment method security and intended spending habits that were not previously available, while providing the user with incentives to disclose travel plans. In doing so, the system and methods override the routine and conventional sequence of a events normally used in providing rewards points for credit card users. Users are incentivized to disclose travel information prior to traveling so they will be able to earn bonus rewards points for transactions made while traveling. This is different than the routine and conventional sequence of events that generally does not involve providing bonus rewards points for transactions specifically made during a pre-disclosed trip. The routine and conventional sequence of events would not incentivize users to disclose their travel plans prior to the trip, thus limiting the card issuer from the authentication and security procedures described herein.

Figure 7:
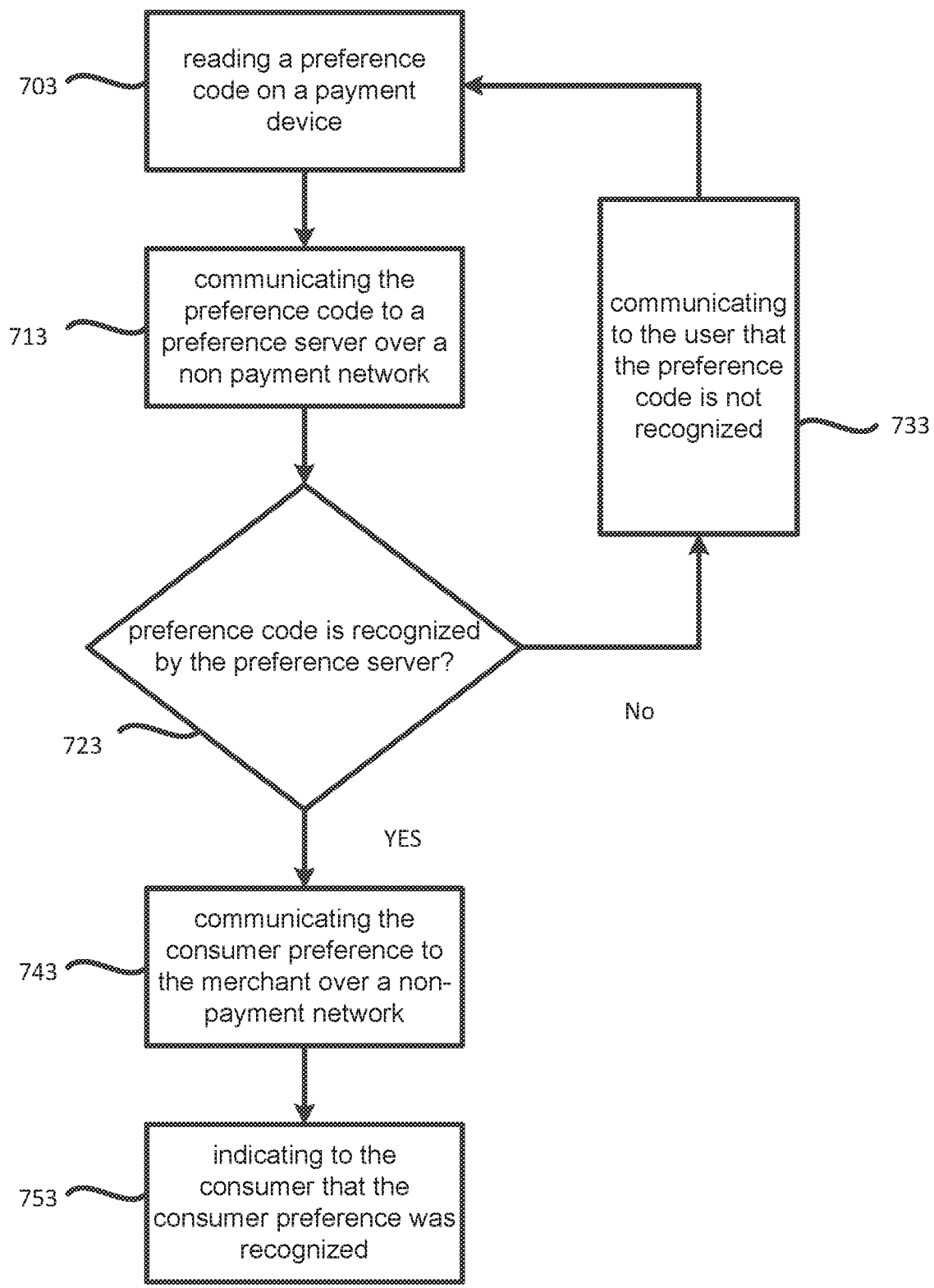
FIG. 7 is an illustration of a method of receiving a preference code and communicating the preference to a merchant.

FIG. 7 may illustrate a method of an illustration of a method of receiving a preference code and communicating the preference to a merchant. At block 703, a preference server 33 may read a preference code 233 from a preference reader 23. The preference code 233 may have a variety of forms as previously mentioned. Further, the payment device 13 may have a variety of forms such as a physical card or a portable computing device with a payment application. The preference reader 33 may communicate the preference code 233 to the preference server 33 over a non-payment network. At block 723, the system may determine if the preference code 233 is recognized by the preference server 33. As previously mentioned, the preferences for a user at a merchant may be previously set using a graphical user interface. If the preference code 233 is not recognized, the preference server 33 may communicate to the user that the preference code 233 is not recognized. If the preference code 233 is recognized, the preferences for the consumer for that merchant may be communicated to the merchant via a non-payment system network. At block 753, the consumer may be informed that the consumer preference was recognized and will be communicated to the merchant. As previously mentioned, as a result of the method and the related physical equipment, several technical advantages may result, such as faster service, more accurate service, less network traffic on the payment network 63, etc.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s). Alternatively, the user devices, computers and servers described herein may be special purpose computer devices and servers designed specifically for the tasks and routines disclosed.

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving payment systems. The payment device 223 in its many forms with the preference code 233 may address the technical problem of how to quickly and accurately communicate user preferences to a merchant to enable the merchant to be more efficient in delivering services the customer and to ensure additional accuracy for the consumer. By adding the preference code 233 to the physical payment device, preferences for the payment device 233 holder, a user will not have to repeatedly repeat his/her preferences to a merchant where the preferences may be mistaken. Instead, the consumer preferences may be promptly and accurately communicated to a merchant.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A payment device to store and communicate preferences to a merchant comprising:
   a physical payment device to be sensed by a sensor of a preference reader at a merchant comprising:
   a preference code comprising a unique image which is sensed by the sensor of the preference reader, wherein the preference code identifies a preset preference, said preset preference comprising products or services available at the merchant as a function of past purchase histories of a consumer, wherein the reader processor of the preference reader physically configured to transform the unique image into a unique code;
   the reader processor is configured to communicate the unique code to a preference server using a non-payment system network wherein the preference server uses a processor physically configured to:
   determine if the unique code matches a stored unique code;
   in response to the unique code matching a stored unique code, communicating a preset preference to a preference processor at the merchant wherein the preference processor communicate the preset preference to the merchant staff for fulfillment of the identified products or services;
   wherein communicating further comprising:
      communicating a personal account representative code to a point of sale device; and
      communicating from the point of sale device the personal account representative code to a validation server on a payment system network;

in response to the validation server approving the personal account representative code, communicating an approval code to the point of sale device over the payment network; and executing a transaction for the preset preference at the merchant.

2. The payment device of claim 1, wherein the preference code comprises at least one of a QR code or a bar code.

3. The payment device of claim 1, wherein the preference code is pre-assigned to a payment device.

4. The payment device of claim 1, wherein the preset preference is set by a consumer.

5. The payment device of claim 4, wherein further comprising from the consumer:

receiving the preference code by a preference server;
authorizing the preference code by the preference server;
in response to the preference code being authorized, presenting to the consumer with a plurality of options;
receiving a selection of the options which may be stored as user preferences;
storing the selections as the user preferences along with the preference code, wherein the user preferences are accessible by verified merchants in response to receiving the preference code.

6. The payment device of claim 5, further comprising presenting a graphical user interface to the consumer for setting the preferences.

7. The payment device of claim 1, wherein the preference reader is in communication with a point of sale device.

8. The payment device of claim 1, wherein the payment device is at least one of a physical credit card or a physical debit card.

9. The payment device of claim 1, wherein the payment device is a mobile computing device which comprises a processor which is physically configured to execute a payment application.

10. The payment device of claim 8, wherein the payment application uses token to represent a personal account number.

11. The payment device of claim 1, wherein the preference code is a hologram.

12. The payment device of claim 1, wherein the preference code is stored in a chip on a physical payment device.

13. The payment device of claim 1, wherein the preference code is stored as part of the magnetic stripe.

14. The payment device of claim 1, wherein the personal account number is represented by a token.

15. The payment device of claim 1, wherein the preference reader is a separate device from the point of sale device.

16. A computer implemented method of increasing merchant processing and efficiency in serving customers comprising:

receiving a preference code embedded on a memory device of a payment device at a preference reader of a merchant, said memory device storing preferences of a consumer, wherein the preference code identifies a consumer preference of products or services available at the merchant as a function of past purchase histories of a consumer;
digitally communicating the preference code to a preference server over a non-payment network;
determining if the preference code is recognized by the preference server for the consumer and the merchant;
if the preference code is not recognized by the preference server, communicating to the consumer that the preference code is not recognized;
in response to the preference code being recognized by the preference server for the consumer and the merchant, communicate the consumer preference to the merchant over the non-payment network;
indicating to the consumer that the consumer preference was recognized; and
prompting the consumer to submit payment details to the merchant over a payment network to a verification server.

17. The computer implemented method of claim 16, wherein the preference code is communicated according to a protocol.

18. The computer implemented method of claim 16, further comprising receiving presetting preferences from a consumer for a merchant using a graphical user interface.

19. The computer implemented method of claim 16, wherein the preference code is at least one of:

a hologram on a payment device;
a visible code on the payment device;
an invisible code on the payment device;
a code in a magnetic stripe on the payment device; and
a signal communicated from a wireless communication device that is part of the payment device.

20. The computer implemented method of claim 16, wherein the preference code is communicated as an electronic token.

* * * * *